United States Patent [19]
Marchetti et al.

[11] Patent Number: 4,509,176
[45] Date of Patent: Apr. 2, 1985

[54] LONGITUDINAL-DISCHARGE-PULSE LASER WITH PREIONIZATION OBTAINED BY CORONA EFFECT

[75] Inventors: Renato Marchetti; Eugenio Penco, both of Rome, Italy

[73] Assignee: Selenia Industrie Elettroniche Associate S.p.A., Rome, Italy

[21] Appl. No.: 388,590

[22] Filed: Jun. 15, 1982

[30] Foreign Application Priority Data

Jun. 17, 1981 [IT] Italy ............................. 48705 A/81

[51] Int. Cl.³ .......................................... H01S 3/097
[52] U.S. Cl. ........................................ 372/86; 372/38; 372/82; 372/87
[58] Field of Search ................. 372/86, 81, 82, 87, 372/38, 55

[56] References Cited

U.S. PATENT DOCUMENTS

| | | | |
|---|---|---|---|
| 3,460,053 | 8/1969 | Leonard | 372/82 |
| 3,597,700 | 8/1971 | Rouy | 372/82 |
| 3,704,428 | 11/1972 | Barry et al. | 372/58 |
| 3,967,214 | 6/1976 | Thatcher | 372/82 |
| 4,251,751 | 2/1981 | Kolb | 372/81 |

FOREIGN PATENT DOCUMENTS 1256398 12/1971 United Kingdom ................. 372/59

OTHER PUBLICATIONS

Article by Alan E. Hill titled "Multijoule Pulses from $CO_2$ Lasers", published in Applied Physics Letters, May 1, 1963, vol. 12, No. 9, pp. 324–327.
Article by George J. Dezenberg et al. titled "Performance of High-Voltage Axially Pulsed $CO_2$ Lasers", published in IEEE Journal of Quantum Electronics, Feb. 1972, pp. 59–65.

Primary Examiner—James W. Davie
Attorney, Agent, or Firm—Karl F. Ross; Herbert Dubno

[57] ABSTRACT

A longitudinal-discharge-pulse laser has two coaxial sections in the form of glass tubes joined together by a grounded central electrode and terminated by two outer electrodes. Each glass tube carries on its outer surface a multiplicity of metal rings connected in parallel, via a step-up transformer, to the anode of a first thyratron for energization with a steep negative pulse to generate a corona effect for the preionization of a gas mixture in the tubes on command of a pulse-cadence generator. This generator also controls a second thyratron, with a predetermined delay, which applies negative trigger pulses to the two outer electrodes for initiating a pumping discharge of the laser.

7 Claims, 5 Drawing Figures

LONGITUDINAL-DISCHARGE-PULSE LASER WITH PREIONIZATION OBTAINED BY CORONA EFFECT

FIELD OF THE INVENTION

Our present invention relates to a longitudinal-discharge-pulse laser in which the preionization is obtained by corona effect.

BACKGROUND OF THE INVENTION

A pulse-discharge laser can be realized by several methods:

(a) utilize a continuous-wave (CW) laser which provides at its output a power of 50–70 W/meter and combine same with a rotating-mirror or electro-optical Q switch. Under these conditions the peak power obtainable is from 50 to 100 times higher than that of the CW laser, i.e. 2.5–3.5 KW/meter.

(b) utilize a CW laser and modify its electrical power-supply system in such a way that pulsing the power supply causes circuation of a current of an order of magnitude greater than that of the current circulating in the CW laser. Under these conditions the peak power obtained ranges from 1 to 7 KW/m and the mean power is around 2.5–3.5 W/m.

(c) pulse a CW laser with very high voltages: 280 KV/meter (see article by Alan E. Hill titled "Multijoule Pulses from $CO_2$ lasers" in *Applied Physics Letters* of May 1, 1968, Vol. 12, No. 9, pp. 524–527) or 90 KV/meter (see article by George V. Dezemberg et al titled "Performance of High-Voltage Axially Pulsed $CO_2$ Lasers" in *IEEE Journal of Quantum Electronics* of February 1972, pp. 59–65); in this way Hill obtained a peak power of 17 KW/meter and a mean power of 28 W/meter (at 40 p.p.s) whereas Dezemberg et al obtained 6.4 KW/meter and a mean power comparable to that obtained by Hill.

The efficiencies achieved are 4–10% according to Hill and 3.6% for Dezemberg et al.

OBJECT OF THE INVENTION

The object of our invention is to realize a pulse laser of the type described at (c) in which the working voltage of the laser is drastically reduced.

SUMMARY OF THE INVENTION

We realize this object by means of preionization of the gas, preferably with the aid of the corona effect.

The discharge trigger which determines the preionization phenomenon is generated by feeding a high-voltage pulse (typically of more than 50 KV) to a series of metal rings placed on glass tubes which form the envelope of the laser. More particularly, the laser is essentially formed by three electrodes of which one is grounded and two are fed with negative pulses; the electrodes are joined by two glass tubes within which are produced two discharges under the command of a thyratron, the preionization being obtained by sending a high-voltage pulse through the aforementioned metal rings placed on these glass tubes. A delay is established between the beginning of the preionization and the triggering of the main discharge.

BRIEF DESCRIPTION OF THE DRAWING

The above and other features of our invention will now be described in greater detail with reference to the accompanying drawing in which:

FIG. 1a shows a block diagram of a device in which corona-type preionization as used in accordance with our invention is obtained by means of radio frequency, ultraviolet radiation or the like;

SPECIFIC DESCRIPTION

Figure 1A:
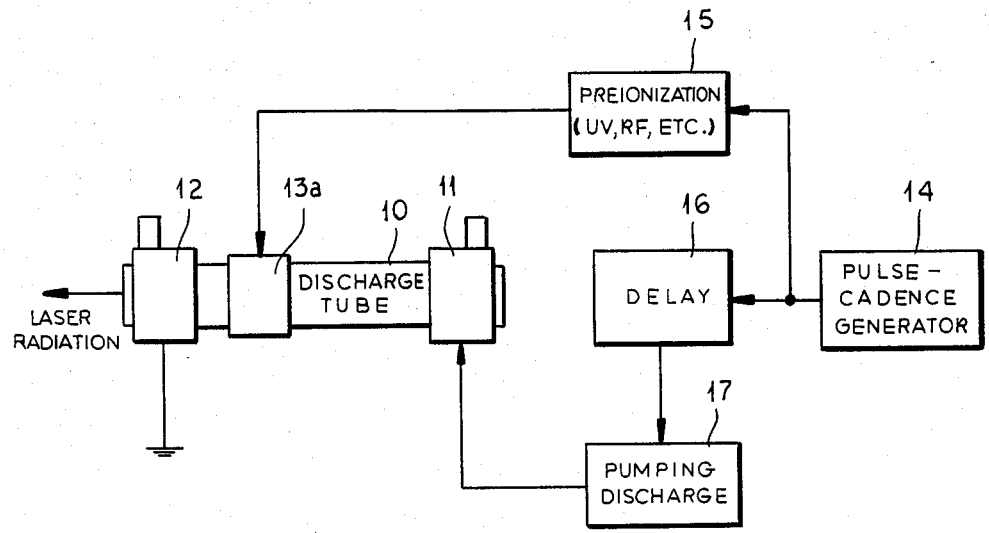
Figure 1B:
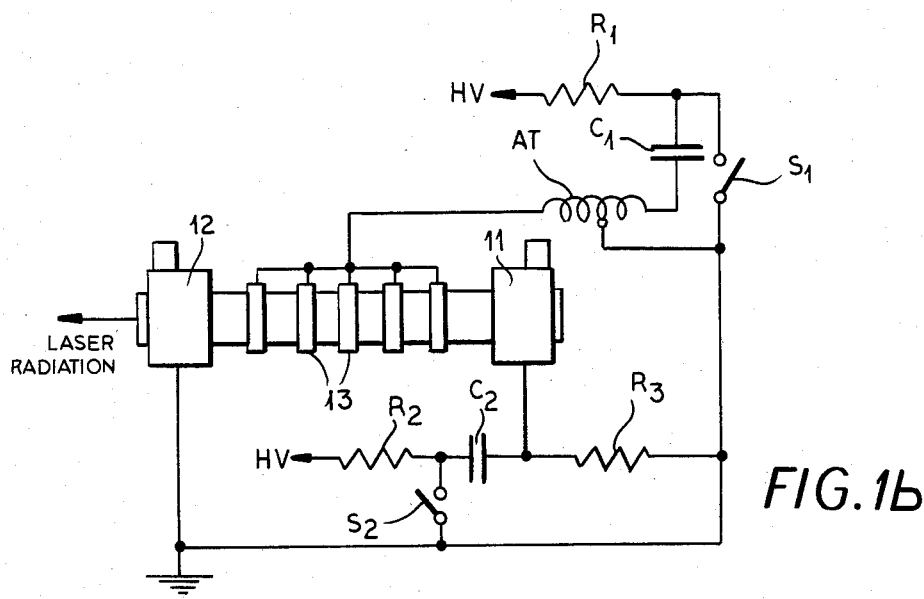
FIG. 1b shows an alternate arrangement for producing preionization by means of the corona effect.

In FIGS. 1a and 1b we show a laser comprising a discharge tube 10 terminated at opposite ends by respective electrodes 11 and 12, the latter being grounded. A pulse-cadence generator 14, shown only in FIG. 1a, periodically triggers a preionization circuit 15 here shown as an emitter of ultraviolet radiation, radio-frequency waves or the like applied to a ring electrode 13a which surrounds the tube 10. The same trigger pulse from generator 14 also reaches, after being retarded in a delay circuit 16, a pumping-discharge generator 17 serving to energize electrode 11 after a gas mixture in tube 10 has been properly preionized. The resulting laser pulse is radiated axially at the left-hand end of tube 10.

In FIG. 1b the preionization electrode 13a has been replaced by a multiplicity of narrower, spaced-apart metal rings 13 all connected in parallel to the output of a pulsing circuit lying between rings 13 and a high-voltage source HV, this circuit comprising a resistor $R_1$, a capacitor $C_1$ and an autotransformer AT in series with one another. An electronic switch $S_1$, controlled by the generator 14 of FIG. 1a, is closable to discharge the preionization capacitor $C_1$ through part of the autotransformer winding whereby a steep negative pulse is applied to the metal rings 13. Circuit 17 is represented by another electronic switch $S_2$ and the series combination of a resistor $R_2$, a capacitor $C_2$ and a resistor $R_3$ inserted between high-voltage source HV and ground, the junction of pumping capacitor $C_2$ and resistor $R_3$ being connected to electrode 11. Closure of switch $S_2$ by generator 14, following the preionization of the gas mixture in tube 10 with a lag introduced by delay circuit 16 of FIG. 1a, again triggers the discharge of the laser.

Figure 2:
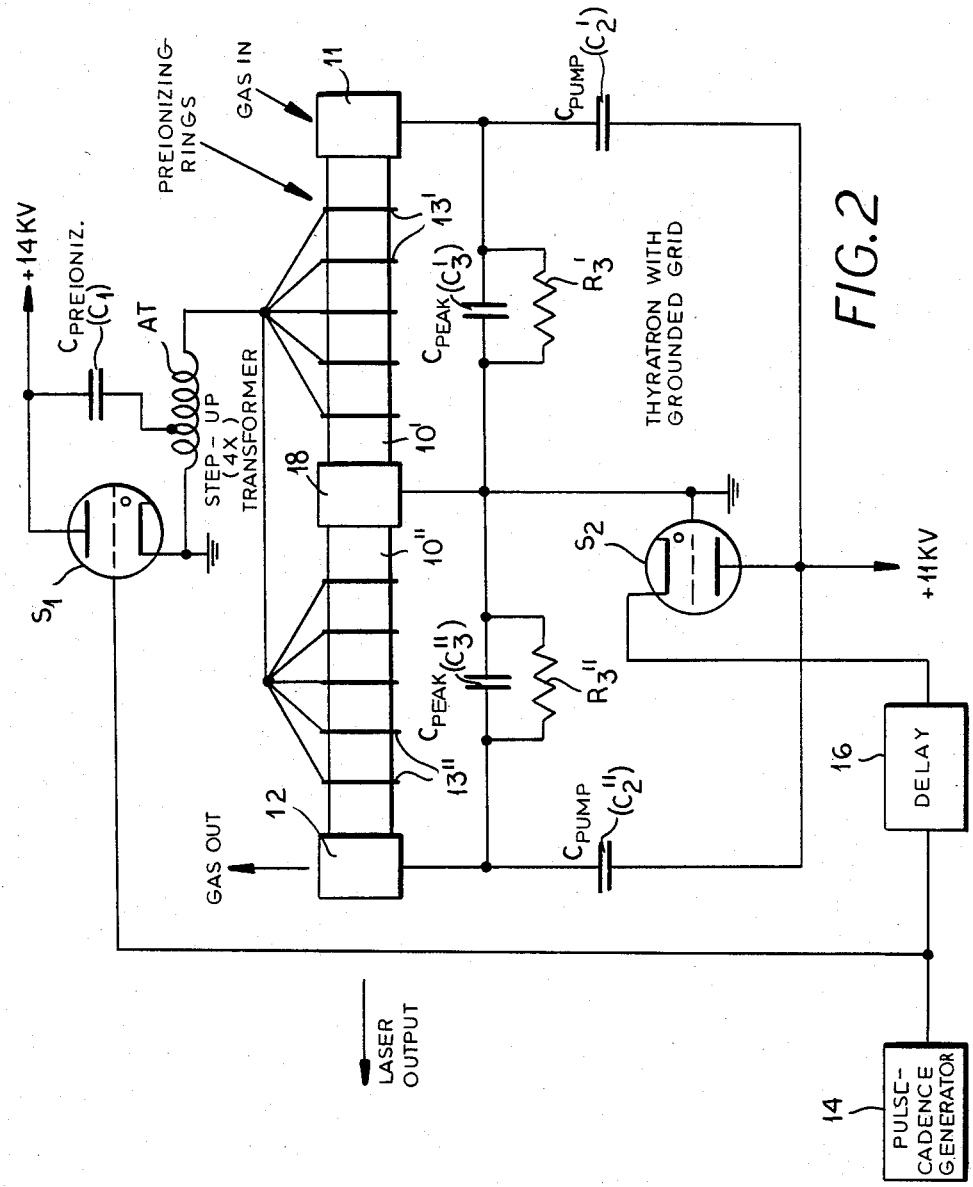
FIG. 2 shows the electrical circuit of a prototype of a laser embodying the invention.

FIG. 2 shows how a laser realized in accordance with our invention is formed by two sections so as to work with reduced voltages.

These sections are constituted by coaxial glass tubes 10' and 10" joined together by an intervening central electrode 18 which is grounded. The free ends of tube 10' and 10" carry outer electrodes 11 and 12, neither of them being grounded in this instance. Tubes 10' and 10" are furthermore surrounded by respective sets of metal rings 13' and 13" all connected in parallel to the output end of autotransformer AT.

Electronic switches $S_1$ and $S_2$ are here shown as thyratrons having anodes respectively connected to voltage sources +14 KV and +11 KV; the series resistors $R_1$ and $R_2$ of FIG. 1b have not been illustrated in FIG. 2. The output of pulse generator 14 is here connected to the grid of thyratron $S_1$, whose cathode is grounded, and by way of delay circuit 16 to the cathode of thyratron $S_2$, whose grid is grounded. Two pumping capacitors $C_2'$ and $C_2''$ are respectively inserted between the anode of thyratron $S_2$ and outer electrodes 11, 12; these latter electrodes are also connected to ground by way of respective time-constant networks $C_3'$, $R_3'$ and $C_3''$, $R_3''$. The preionization of the laser gas by rings 13' and 13'', via electronic switch $S_1$, capacitor $C_1$ and step-up transformer AT, as well as the subsequent triggering of electrodes 11 and 12, via electronic switch $S_2$ and pumping capacitors $C_2'$ and $C_2''$, is analogous to the procedure described with reference to FIG. 1b.

The employment of preionization permits a further drastic lowering of the laser working voltage; by resorting to this technique we succeed with working at voltages below 30 KV/meter in obtaining a peak power of 33 KW/meter and a mean power of 50 W/meter (100 p.p.s.).

Figure 3:
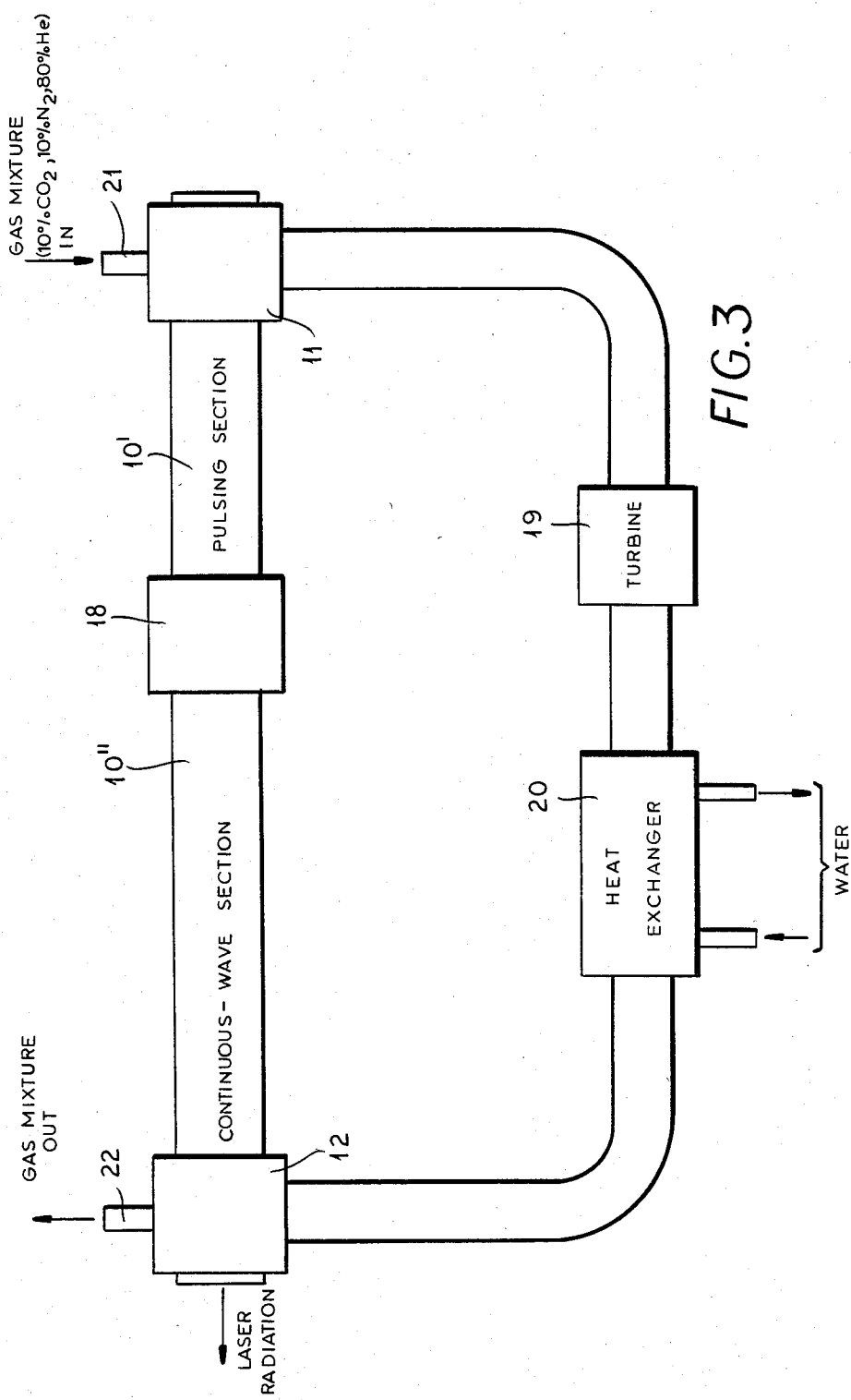
FIG. 3 shows schematically a circuit for the recirculation of the laser gas.
Figure 4:
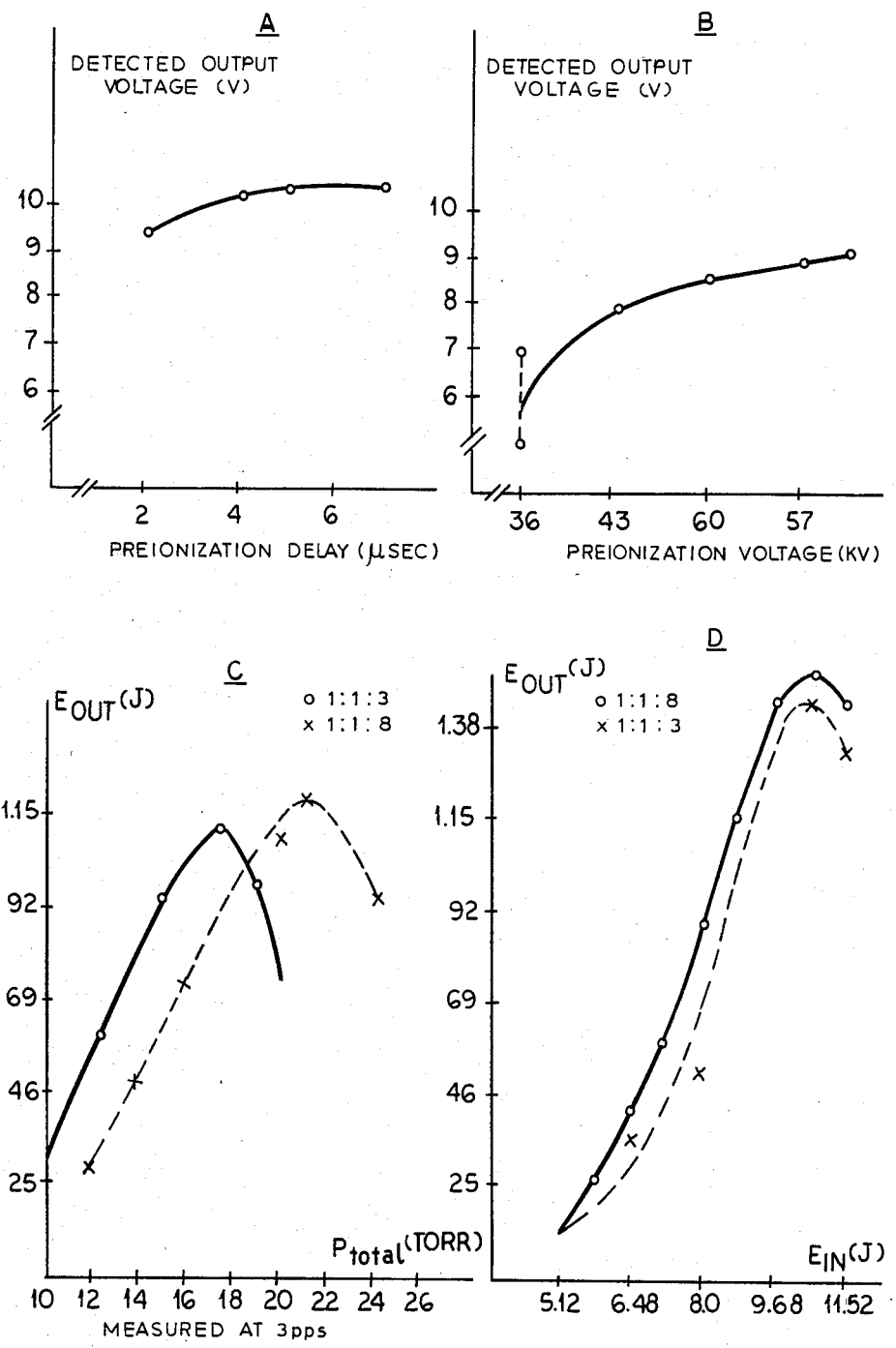
FIG. 4 shows in graph A the dependence of the output energy on the delay, in graph B the dependence of the energy on the preionization-pulse voltage, and in graphs C and D the influence of pumping pressure and energy on the laser output.

A continuous-wave section 10'' operating at the same pressure, in series with a pulsing section 10', and a recirculation of the gas as shown in FIG. 3 can also be used with this laser.

The gas mixture, consisting by way of example of 10% $CO_2$, 10% $N_2$ and 80% He, is fed in at electrode 11 through a port 21 and is extracted at electrode 12 via a port 22. The recirculating part of the mixture is driven by a turbine 19 from the right-hand end of the laser to its left-hand end by way of a heat exchanger 30 in which the gas is cooled by water.

Electrically we have the following sequence: a pulse is applied to the preionization electrode (not shown in FIG. 3) and, after a delay (7 $\mu$sec), the pumping discharge is initiated via electrodes 11, 12 as described above.

A modification of the circuit of FIG. 2 involves omitting the pumping-discharge thyratron $S_2$ and maintaining the voltage of capacitors $C_2'$, $C_2''$ below the level of self-triggering; by starting the preionization discharge, we ionize the gas and the capacitors $C_2'$, $C_2''$ then discharge (this process is analogous to what occurs in flash lamps).

In the following table some of the characteristics of the operation of the laser are given.

The proposed laser may be classified as between a CW laser, modified by the techniques described above, and a transferred-electron amplifier (TEA), but it exhibits the following advantages:

(a) electrical and mechanical:
electrical pulse for the pumping with width of 10-50 microseconds, and with peak currents of the order of 100-200 A, so that normal electrical components may be used;
low-cost electrodes, because not tested for conformance to a particular specification (as in the TEA).

(b) Optic components:
laser pulse of long duration (10-100 $\mu$sec) so that the peak powers in use do not damage the optics;
high uniformity of the beam, with total absence of hot spots (this fact is due to the longitudinal discharge).

(c) Performance, etc.:
high repetition rates obtainable;
possibility of recirculating the gas to reduce its consumption and increase the repetition rates;
low consumption of gas since it works at low pressue (10-50 torr);
modularity: many modules may be mass produced;
high active volume, low volumetric density of pumping;
high efficiency (compared with the CW lasers modified to obtain pulse emission);
possibility of adding sections working in CW;
the proposed laser has supplied 50 W/meter at a repetition rate of 100 p.p.s.

Longitudinal-discharge laser (two sections)
Total length of the discharge: 80 cm
Total volume: 0.95 $dm^3$
maximum pumping energy: 9.7 joules
maximum output energy (at 100 p.p.s.): 1.2 joules
maximum efficiency: 12%
mean output power at 100 p.p.s.: 40 Watt
laser-pulse duration: 45 $\mu$sec
corona-effect preionization energy: 1.6 joules
voltage (in absence of discharge): 60 KV (duration less than 1 $\mu$sec)
Gas mixture: $CO_2$ 10%, $N_2$ 10%; He 80%.

We claim:

1. In a longitudinal-discharge-pulse laser comprising:
two coaxial sections formed by a pair of glass tubes joined together by a grounded central electrode and terminated by two outer electrodes;
an ionizable gas mixture in said glass tubes;
a multiplicity of metal rings spacedly surrounding each of said glass tubes;
a pulse-cadence generator periodically emitting a series of command pulses;
first electronic switch means connected to said generator for emitting a steep negative preionizing pulse to all said metal rings simultaneously in response to each command pulse, thereby giving rise to a corona effect in a zone encompassed by each metal ring with resulting preionization of said gas mixture; and
second electronic switch means connected via a delay circuit to said generator for simultaneously emitting a negative trigger pulse to said outer electrodes in response to each command pulse, thereby initiating a pumping discharge in said sections.

2. A laser as defined in claim 1 wherein said first switch means comprises a first thyratron with a grounded cathode, a grid connected to said generator and an anode coupled via a preionization capacitor to said metal rings, said second switch means comprising a second thyratron with a cathode connected to said delay circuit, a grounded grid and an anode coupled via respective pumping capacitors to said outer electrodes.

3. A laser as defined in claim 2, further comprising a step-up transformer inserted between said preionization capacitor and said metal rings.

4. A laser as defined in claim 1 wherein said command pulse is retarded in said delay circuit by substantially 7 microseconds.

5. A laser as defined in claim 1, further comprising conduit means connected to said glass tubes at said outer electrodes for recirculating said gas mixture therethrough by way of a heat exchanger.

6. A laser as defined in claim 1 wherein said gas mixture consists essentially of substantially 10% $CO_2$, 10% $N_2$ and 80% He.

7. A laser as defined in claim 2 wherein said outer electrodes are connected to ground by way of respective RC networks.

* * * * *